Figure 1:
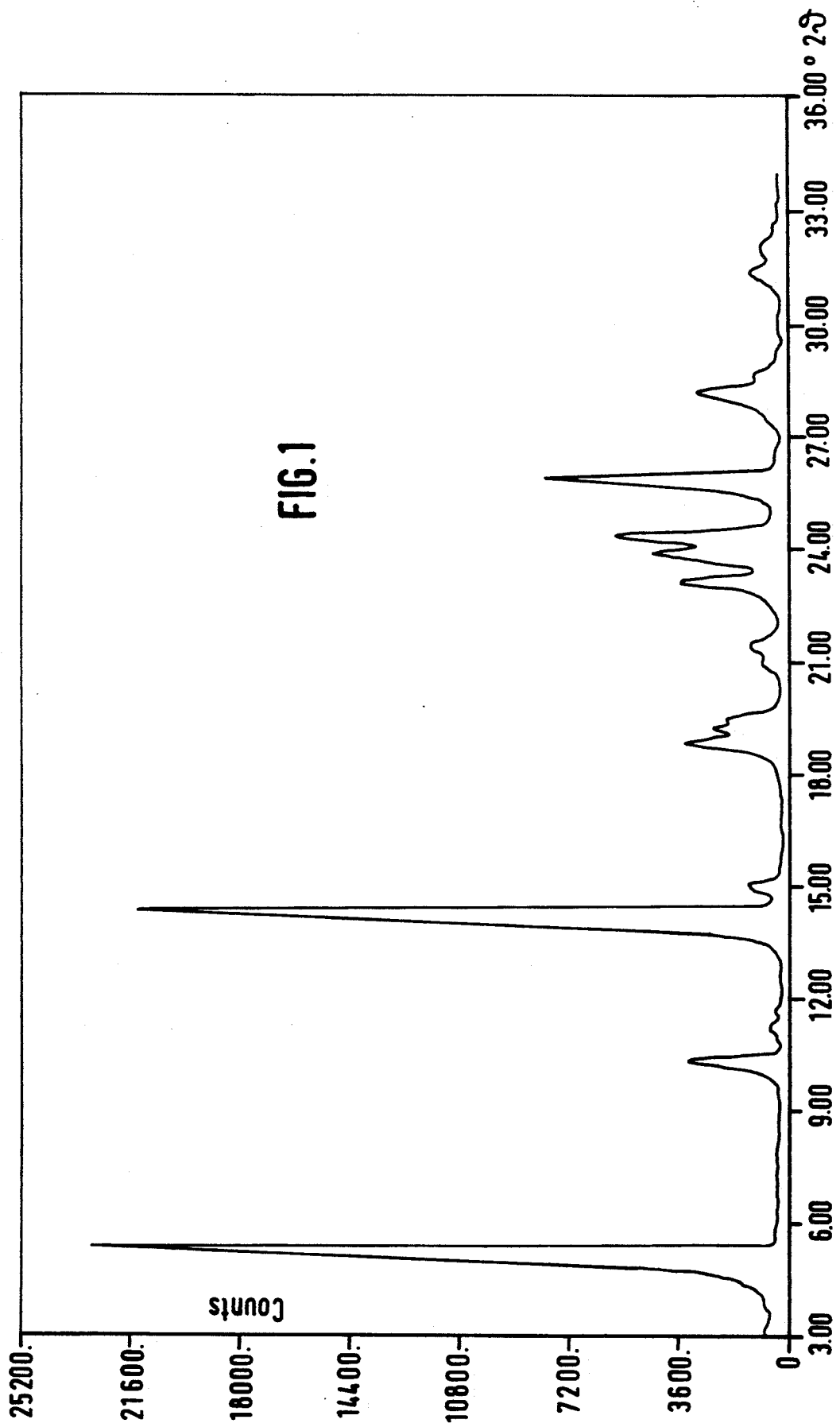

United States Patent [19]

Spietschka et al.

[11] Patent Number: 5,154,770
[45] Date of Patent: * Oct. 13, 1992

[54] MIX-CRYSTAL PIGMENTS BASED ON PERYLENETETRACARBIMIDES, PROCESS FOR THEIR PREPARATION AND THEIR USE

[75] Inventors: Ernst Spietschka, Idstein/Taunus; Helmut Tröster, Königstein/Taunus, both of Fed. Rep. of Germany

[73] Assignee: Hoechst Aktiengesellschaft, Frankfurt am Main, Fed. Rep. of Germany

[*] Notice: The portion of the term of this patent subsequent to Sep. 6, 2005 has been disclaimed.

[21] Appl. No.: 587,158

[22] Filed: Sep. 19, 1990

Related U.S. Application Data

[63] Continuation of Ser. No. 68,746, Jun. 29, 1987, abandoned, which is a continuation of Ser. No. 782,360, Oct. 1, 1985, abandoned.

[30] Foreign Application Priority Data

Oct. 3, 1984 [DE] Fed. Rep. of Germany ....... 3436208

[51] Int. Cl.⁵ ................................. C08K 5/04
[52] U.S. Cl. ..................... 106/498; 106/22; 106/23; 106/493; 106/494; 546/37
[58] Field of Search ............. 106/22, 23, 493, 494, 106/498; 546/37

[56] References Cited

U.S. PATENT DOCUMENTS

| | | | |
|---|---|---|---|
| 2,905,685 | 9/1959 | Eckert et al. | 106/22 |
| 2,905,686 | 9/1959 | Eckert et al. | 106/22 |
| 3,554,776 | 1/1971 | Gerson et al. | 106/498 |
| 4,262,851 | 4/1981 | Graser et al. | 241/16 |
| 4,769,460 | 9/1988 | Spietschka et al. | 106/498 |

FOREIGN PATENT DOCUMENTS

| | | |
|---|---|---|
| 912757 | 10/1972 | Canada . |
| 122442 | 10/1984 | European Pat. Off. . |
| 1094897 | 12/1960 | Fed. Rep. of Germany . |
| 1807729 | 6/1970 | Fed. Rep. of Germany . |
| 2009073 | 9/1970 | Fed. Rep. of Germany . |
| 51-7025 | 1/1976 | Japan . |
| 897707 | 5/1962 | United Kingdom . |

Primary Examiner—William R. Dixon, Jr.
Assistant Examiner—Scott L. Hertzog
Attorney, Agent, or Firm—Connolly and Hutz

[57] ABSTRACT

Perylenetetracarbimide mix-crystal pigments in the crystal lattice of the α-modification of N,N'-bis-3',5'-dimethylphenylperylenetetracarbimide of the formula (1) comprising 99–70 mole percent of the symmetrical diimide of the formula (1) and correspondingly 1–30 mole percent of the asymmetrically substituted diimide of the formula (2)

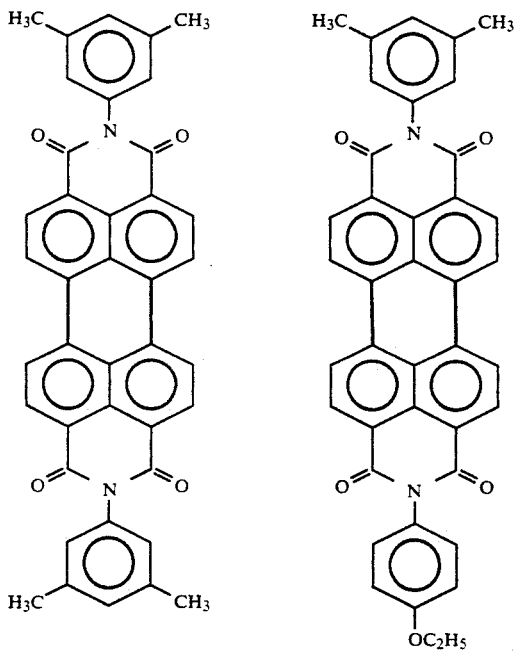

process for their preparation and their use for coloring organic polymers.

2 Claims, 3 Drawing Sheets

MIX-CRYSTAL PIGMENTS BASED ON PERYLENETETRACARBIMIDES, PROCESS FOR THEIR PREPARATION AND THEIR USE

This application is a continuation, abandoned, of application Ser. No. 68,746, filed Jun. 29, 1987, abandoned which is a continuation of Ser. No. 782,360, filed Oct. 1, 1985, abandoned.

The present invention relates to new mix-crystal pigments based on perylenetetracarbimides in the crystal lattice of the α-modification of N,N'-bis-3',5'-dimethylphenylperylenetetracarbimide, to a process for their preparation, and to their use for coloring organic polymers.

For use in high-melting plastics, pigments should not only have high light and weathering fastness properties but also be able to withstand the high processing temperatures without change in the color impression, i.e. have adequate thermal stability. In this field of use, there is increasing interest in organic colorants as alternatives to the previously predominantly used cadmium pigments.

The range of available organic pigments for high-melting synthetic polymers, in particular polyolefins, is incomplete owing to the required high thermal stability.

It has been known for a long time that the perylene pigment of the formula (1)

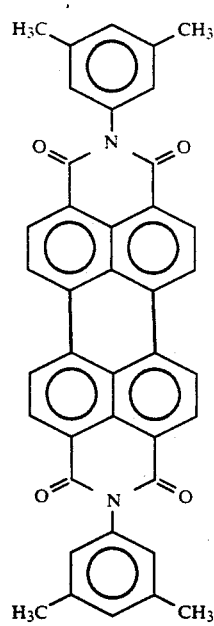
(1)

is particularly suitable for obtaining bright red shades in the field of use in question. This compound, which is obtainable by the method of German Patent 1,067,157 (U.S. Pat. No. 2,905,685) and which is produced therein in a crystal phase which is referred to in Japanese Patent Application J 51007-025 and in European Patent 023,191 (U.S. Pat. No. 4,404,385) as the α-modification, produces after conversion into a finely divided pigment form, for example by means of conventional milling in a vibratory or roll mill, a pure red coloration of high tinctorial strength and good thermal stability.

The increased use of high-melting polymers such as polypropylene and the trend toward high production speeds in the case of plastics goods has in recent years led to a toughening of the thermal conditions and hence also to the demand for a further increase in the thermal stability of this pigment.

Moreover, many plastics converters have long expressed a wish for a distinctly yellower strong red of appropriate fastness level.

It is true that N,N'-bis-4'-ethoxyphenylperylenetetracarbimide of the formula (4)

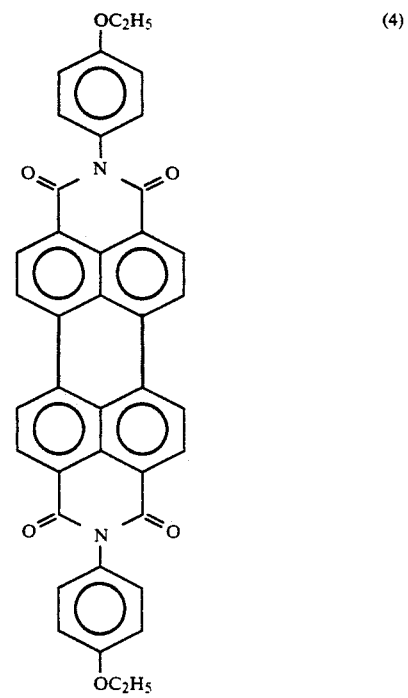
(4)

which has been known for a long time is such a bright yellowish red. However, the inadequate thermostability of this pigment rules out any use in high-melting polymers, in which, at the high processing temperatures, it undergoes a color change toward bluish red.

The invention provides new perylenetetracarbimide mix-crystal pigments in the crystal lattice of the α-modification of N,N'-bis-3',5'-dimethylphenyl-perylenetetracarbimide of the formula (1) comprising 99–70 mole percent of the symmetrical diimide of the formula (1) and correspondingly 1–30 mole percent of the asymmetrically substituted diimide of the formula (2)

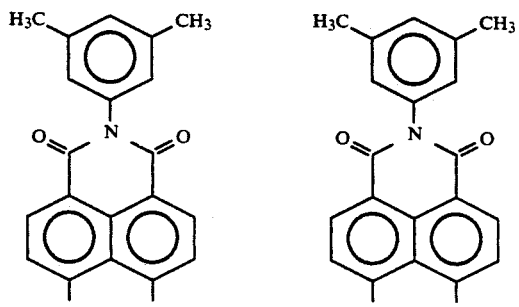

-continued

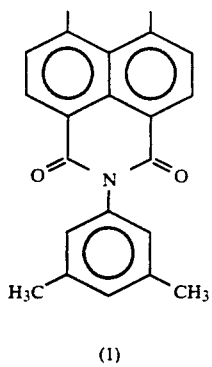

(1)

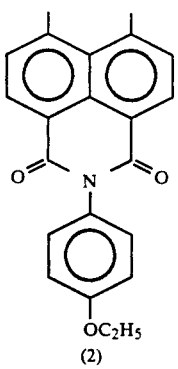

(2)

a process for their preparation by condensing a mixture of 99-70 mole percent of perylenetetracarboxylic dianhydride and correspondingly 1-30 mole percent of the perylenetetracarboxylic mono phenetidide of the formula (3)

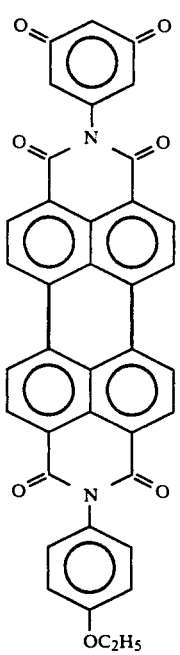

(3)

with an at least stoichiometric amount of 3,5-dimethylaniline in a manner known per se, and their use for coloring organic polymers.

The perylenetetracarbimide mix-crystal pigments thus obtainable produce after conversion into a finely divided pigment form using customary finishing methods, for example milling, in high-melting polymers, in particular in polyethylene and polypropylene, colorations which, when compared with the pure pigment of the stated formula (1), have not only the desired yellower hue but also a distinctly improved thermal stability. The degree of the shift toward yellow can be controlled by variation of the share of the component of the formula (2) in the mix-crystal.

The new perylenetetracarbimide mix-crystal pigments which are comprised of the compounds of the stated formulae (1) and (2) in the abovementioned molar ratio form mix-crystals which crystallize in the same crystal lattice as the α-modification of the compound of the stated formula (1).

Figure 2:
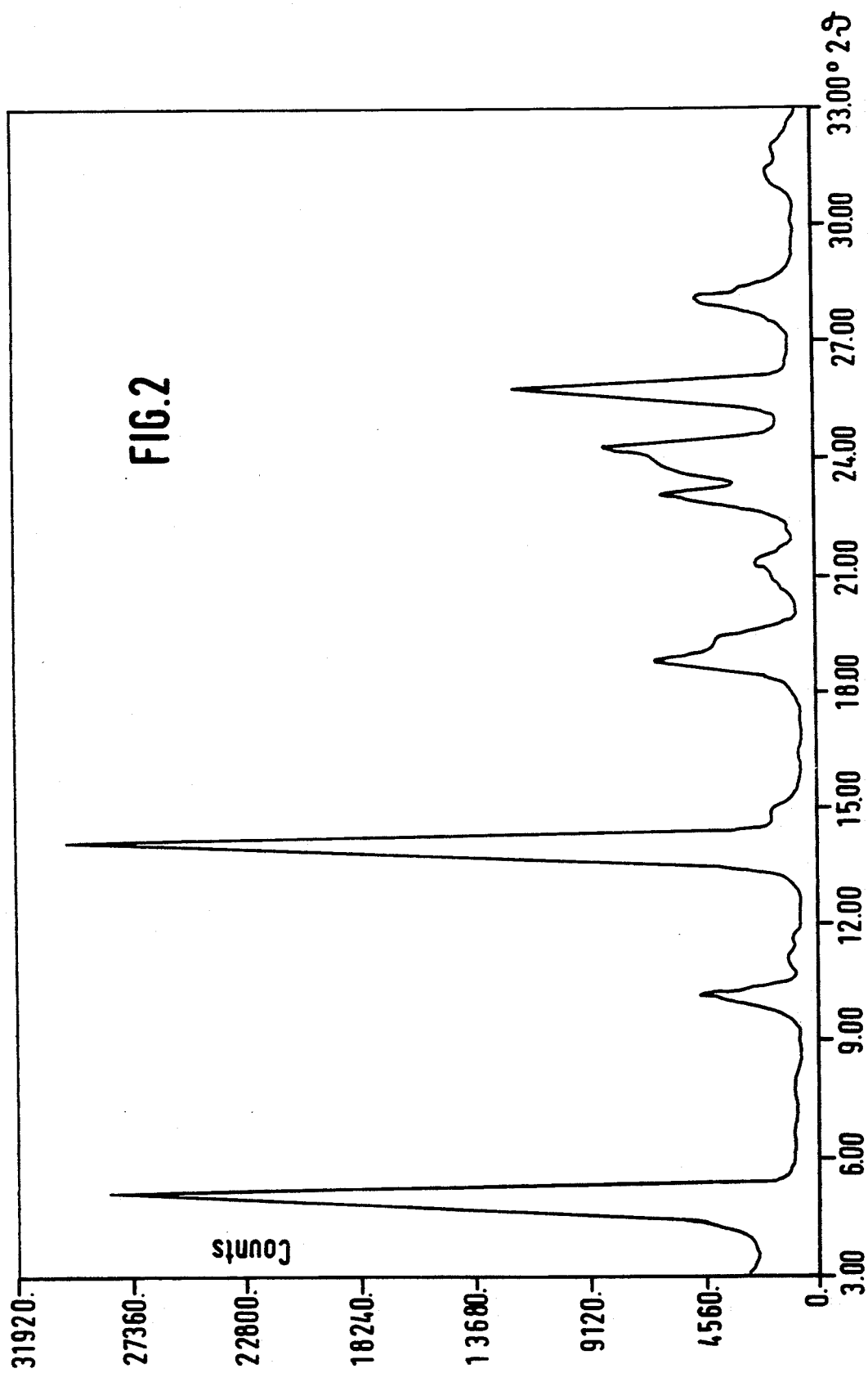

The appendix shows for comparison the x-ray diffraction diagrams of the crystal lattice of two typical mix-crystals obtainable according to the invention (FIGS. 2 and 3) and of the α-modification of the compound of the stated formula (1) (FIG. 1). It can be seen that the diagrams are identical, from which it follows that the crystal lattices are also identical.

The amount of monoanhydride of the formula (3) used in the co-condensation according to the invention is preferably 5-15 mole percent, so that as a consequence of the virtually quantitative reaction, the preferred share of the asymmetrically substituted diimide of the formula (2) in the mixed phase of the components of the formulae (1) and (2) is likewise between 5 and 15 mole percent.

The starting compound of the formula (3) can be obtained in accordance with the indications of German Patent Application P 33 09 060.2 (European Patent Application 84 102 55.4) now European laid-open application 122,442, published Oct. 24, 1984, corresponding essentially to U.S. application Ser. No. 588,541, filed Mar. 12, 1984.

The co-condensation reaction can be carried out in a known manner, for example in accordance with the indications of German Patent 1,105,085 (British Patent 897,707), German Auslegeschrift 1,094,897 or German Offenlegungsschrift 1,807,729, by reacting the mixture of the reactants at elevated temperatures of about 150°-220° C., in the presence or absence of a condensation accerlerant such as zinc chloride, zinc carboxylate or any mineral acid, in a high-boiling solvent, such as, for example, dichlorobenzene, trichlorobenzene, nitrobenzene, N-methylpyrrolidone, quiinoline, phenols or also in an excess of 3,5-dimethylaniline. The reaction products can be separated off in a conventional manner by filtration, if desired after prior dilution with a low-boiling alcohol, such as methanol.

To convert the resulting dry crude pigment into a finely divided, transparently coloring pigmentary form, the crude pigment can be milled conventionally, for example in a vibratory or roll mill, in the presence of milling assistants. The milling bodies generally used therein are steel or corundum balls or steel or corundum cylpebs. The milling assistants can be water-soluble salts, such as sodium sulfate, aluminum sulfate or sodium chloride, which, after the milling has been completed, are separated from the pigment in known manner by aqueous salt extraction.

Mix-crystal pigments of the perylenetetracarbimide series are already known. U.S. Pat. No. 3,554,776 claims pigments comprising a solid solution of at least two perylenetetracarbimides. The compounds underlying these pigments are symmetrical N,N'-substituted perylenetetracarbimides. By comparison, the mix-crystals according to the invention, where one component of the stated formula (2) is a defined asymmetrically substituted diimide, have a different chemical composition. This is also true of the solid solutions of perylenetetracarbimide pigments disclosed in German Offenlegungsschrift 2,009,073 (Canadian Patent 912,757). These pigments are likewise mixtures comprised of symmetrically N,N'-substituted perylenetetracarbimides.

The new mix-crystal pigments obtainable according to the invention are suitable for coloring paints and plastics, such as polyvinyl chloride, polystyrene or polyamide, and are particularly advantageous for pigmenting high-melting polymers, such as polyethylene and polypropylene, and for spin-coloring polypropylene. Compared with the perylene pigment of the stated formula (1) obtainable for example in accordance with German Patent 1,067,157 (U.S. Pat. No. 2,905,685) they have the same crystal modification—after corresponding conversion into a finely divided, transparent pigmentary form—and in high-melting organic polymers, in particular in polyolefins, in at least equal tinctorial strength and yellower hue a distinctly higher heat stability.

Compared with the opaquely coloring pigmentary forms of the bis-xylidide of the stated formula (1) disclosed in German Auslegeschrift 2,832,761 (U.S. Pat. No. 4,262,851) and European Patent 042,819 (U.S. Pat. No. 4,404,386), they have a distinctly yellower, purer hue and a superior tinctorial strength.

In the following examples, the percentages ar by weight unless otherwise stated.

The x-ray diffraction diagrams were recorded with copper-K α-radiation using a computer-aided D500 powder diffractometer from SIEMENS.

EXAMPLE 1

A mixture of 52.9 g of perylenetetracarboxylic dianhydride and 7.7 g of perylenetetracarboxylic monoanhydride mono-4'-ethoxypyenylimide is stirred at 180°–185° C. in a mixture of 190 g of 3,5-dimethylaniline and 440 g of quinoline in the presence of 3.0 g of anhydrous zinc chloride for 8 hours with continuous removal of the water of reaction by distillation. This is followed by filtering with suction at 100° C. and the reaction product is washed with methanol, dilute hydrochloric acid and then with water until acid-free and is dried. The co-condensation product, uniformly crystallized out in red needles and obtained in a yield of 88.9 g (98.8% of theory), is about 90 mole percent of component of the formula (1) and about 10 mole percent component of the formula (2). According to the x-ray diffraction diagram (cf. FIG. 2) it corresponds to the α-modification of the component of the formula (1) (cf. FIG. 1).

To convert into a finely divided pigment form, 30 g of co-condensation product are milled with 150 g of anhydrous sodium sulfate in a 1 liter plastics milling vessel holding 1400 g of corundum balls (diameter 12 mm) on a vibratom vibrating table for 6 hours, and the mill base is dried after an aqueous salt extraction and is comminuted in an IK cross beater mill (from JANKE und KUNKEL). (The same method is also used to comminute the products obtained in the following examples).

EXAMPLE 2

Figure 3:
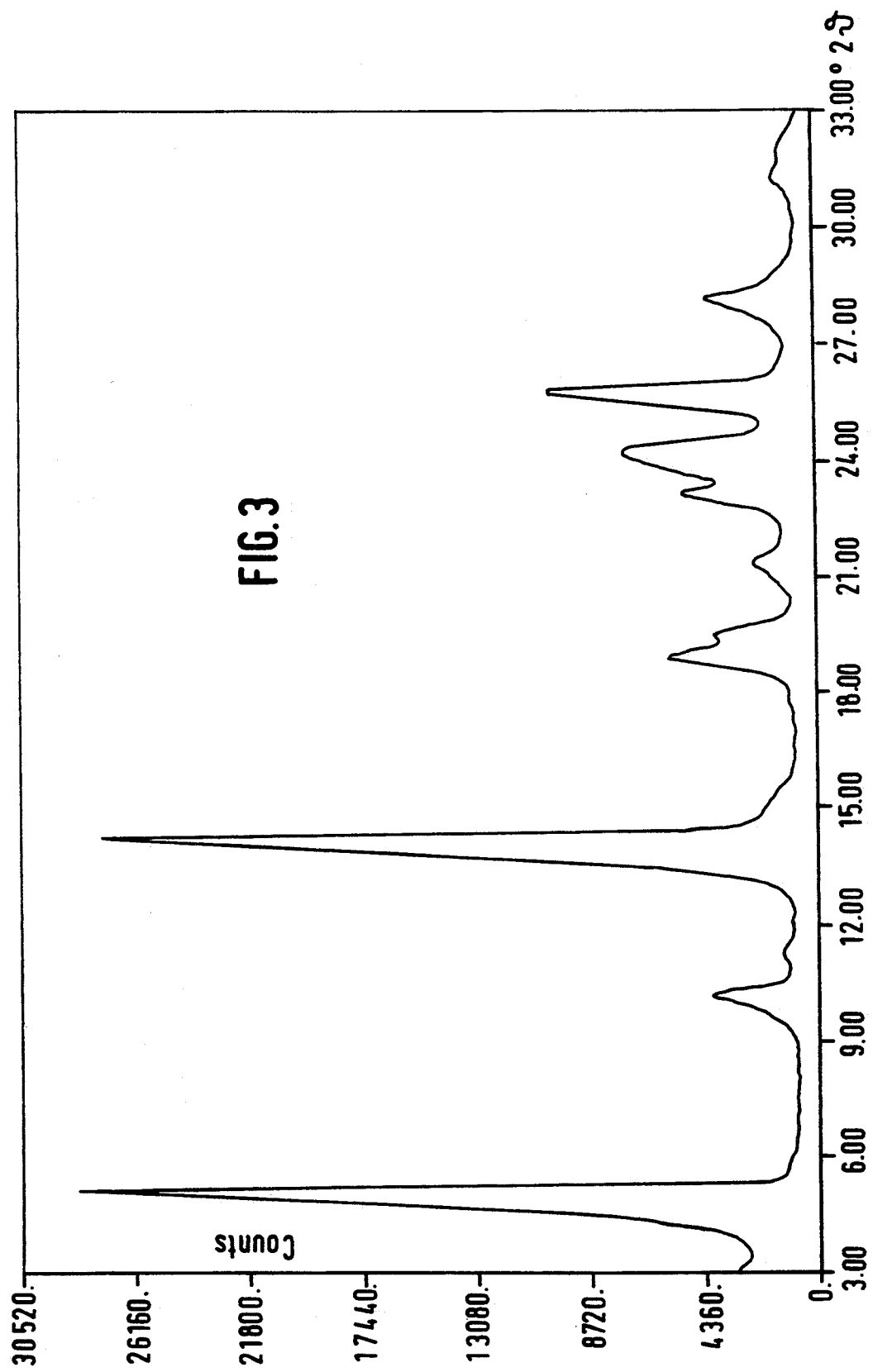

If a mixture of 41.2 g of perylenetetracarboxylic dianhydride and 23.0 g of perylenetetracarboxylic monoanhydride mono-4'-ethoxyphenylimide is used instead of a mixture of 52.9 g and 7.7 g, respectively, of the stated compounds and the procedure used is otherwise as described in example 1, this gives, in a yield of 89.9 g (99.4% of theory), the corresponding uniformly crystalline yellowish red co-condensation product in the form of mix-crystals of the α-modification of the pure compound of the formula (1) (cf. FIG. 3). It is about 70 mole percent component of the formula (1) and about 30 mole percent component of the formula (2).

EXAMPLE 3

A suspension of 37.2 g of perylenetetracarboxylic dianhydride, 2.6 g of perylenetetracarboxylic monoanhydride mono-4'-ethoxyphenylimide, 2.2 g of crystalline zinc acetate and 200 g of 3,5-dimethylaniline is stirred at 180° C. for 6 hours. The co-condensation product comprised of about 95 mole percent of component of the formula (1) and about 5 mole percent of component of the formula (2) and otherwise in a yield of 59.1 g (99.5% of theory) likewise forms mix-crystals in the α-modification of the component of the formula (1).

EXAMPLE 4 (COMPARATIVE EXAMPLE)

62.0 g of perylenetetracarboxylic dianhydride are stirred at 185° C. in 210 g of 3,5-dimethylaniline in the presence of 3.2 g of anhydrous zinc chloride for 8 hours, and the resulting bis-xylidide of the formula (1) is isolated in conventional manner. The yield is 92.5 g (97.9% of theory). The reflection angles in the x-ray diffraction diagram (cf. FIG. 1 in the appendix) agree with the angles disclosed in the abovementioned Japanese patent application for the crystal phase, referred to as the α-modification, of this compound.

Determination of the heat stability by the DIN 53772-A test 0.75 g of the pigment to be tested and 500 g of polyethylene (®Hostalen GC 7260 powder) are mixed at room temperature and 2000 revulsions per minute in a Collin high-speed mixer for one minute. After addition of 7.14 g of ®Remafin White RCL-AE 30 ($\triangleq$1% $TiO_2$) the mixture is extruded at 180° in 2 passes on an extruder (Weber ET 20). The resulting granulate is subsequently molded on an injection molding machine (Aarbug Allrounder 221 E/170 P) into sheets at test temperatures of 200°–300° C. in intervals of 20° C. and a dwell time of 5 minutes.

| Results (standard depth of shade ⅓ after DIN 53235) | | |
|---|---|---|
| Example | Heat stability (color difference $E^*_{ab} = 3$) | Hue angle (DIN 6174) |
| 1 | >300° C. | 26.1° |
| 2 | >300° C. | 26.9° |
| 3 | >300° C. | 25.1° |
| 4 (comparison) | 270° C. | 23.3° |

The results set out in the above table show the superior heat stability and the distinctly yellower hue of the mix-crystal pigments according to the invention compared with the pure perylene pigment of the formula (1).

We claim:

1. A perylenetetracarbimide mix-crystal pigment based on the crystal lattice of the α-modification of N,N'-bis-3',5'-dimethylphenylperylenetetracarbimide of the formula (1) comprising 99–70 mole percent of the symmetrical diimide of the formula (1) and correspondingly 1–30 mole percent of the asymmetrically substituted diimide of the formula (2)

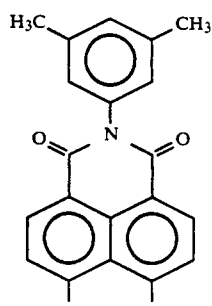
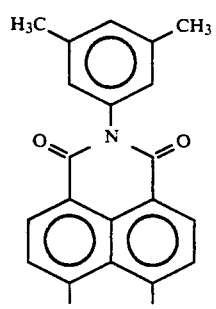
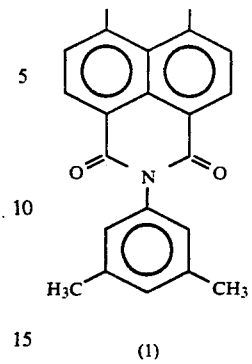
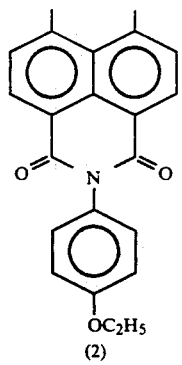
(1)          (2)
2. The perylenetetracarbimide mix-crystal pigment as claimed in claim 1 consisting essentially of 95–85 mole percent of the diimide of the formula (1) and correspondingly 5 to 15 mole percent of the diimide of the formula (2).
* * * * *